(12) United States Patent
Shah et al.

(10) Patent No.: US 8,090,859 B2
(45) Date of Patent: *Jan. 3, 2012

(54) DECOUPLING TCP/IP PROCESSING IN SYSTEM AREA NETWORKS WITH CALL FILTERING

(75) Inventors: Hemal V. Shah, Trabuco Canyon, CA (US); Greg J. Regnier, Portland, OR (US); Annie Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1357 days.

This patent is subject to a terminal disclaimer.

(21) Appl. No.: 11/339,242

(22) Filed: Jan. 24, 2006

(65) Prior Publication Data

US 2006/0123130 A1    Jun. 8, 2006

Related U.S. Application Data

(63) Continuation of application No. 09/768,374, filed on Jan. 22, 2001, now abandoned, and a continuation of application No. 09/768,375, filed on Jan. 22, 2001, now Pat. No. 7,024,479.

(51) Int. Cl.
  *G06F 15/16*    (2006.01)
(52) U.S. Cl. ...................................................... 709/230
(58) Field of Classification Search .................. 709/246, 709/230–232; 370/352, 466; 718/105
See application file for complete search history.

(56) References Cited

U.S. PATENT DOCUMENTS

| | | | |
|---|---|---|---|
| 5,485,460 A | 1/1996 | Schrier et al. | |
| 5,568,487 A | 10/1996 | Sitbon et al. | |
| 5,619,650 A | 4/1997 | Bach et al. | |
| 5,721,872 A | 2/1998 | Katsuta | |
| 5,721,876 A | 2/1998 | Yu et al. | |
| 5,778,189 A * | 7/1998 | Kimura et al. | 709/236 |
| 5,941,988 A | 8/1999 | Bhagwat et al. | |
| 6,003,084 A | 12/1999 | Green et al. | |
| 6,006,268 A | 12/1999 | Coile et al. | |
| 6,081,900 A | 6/2000 | Subramaniam et al. | |
| 6,145,031 A | 11/2000 | Mastie et al. | |
| 6,154,743 A | 11/2000 | Leung et al. | |
| 6,185,601 B1 * | 2/2001 | Wolff | 709/203 |
| 6,192,362 B1 | 2/2001 | Schneck et al. | |
| 6,212,550 B1 | 4/2001 | Segur | |
| 6,282,580 B1 * | 8/2001 | Chang | 719/316 |
| 6,324,582 B1 * | 11/2001 | Sridhar et al. | 709/230 |
| 6,347,337 B1 | 2/2002 | Shah et al. | |
| 6,460,080 B1 | 10/2002 | Shah et al. | |
| 6,480,901 B1 | 11/2002 | Weber et al. | |
| 6,549,937 B1 | 4/2003 | Auerbach et al. | |
| 6,560,613 B1 * | 5/2003 | Gylfason et al. | 707/200 |
| 6,615,201 B1 | 9/2003 | Seshadri et al. | |
| 6,625,258 B1 | 9/2003 | Ram et al. | |
| 6,665,674 B1 | 12/2003 | Buchanan et al. | |

(Continued)

OTHER PUBLICATIONS

A. Fox et al., "Cluster-Based Scalable Network Services", Proc. Of the sixteenth ACM Symp. On Operating systems principles, pp. 78-91, 1997.

(Continued)

*Primary Examiner* — Chirag Patel

(74) *Attorney, Agent, or Firm* — Steven D. Yates

(57) ABSTRACT

Proxy nodes perform TCP/IP processing on behalf of application nodes, utilize lightweight protocols to communicate with application nodes, and communicate with network nodes and network clients using Transmission Control Protocol/Internet Protocol (TCP/IP).

25 Claims, 12 Drawing Sheets

U.S. PATENT DOCUMENTS

| | | | | |
|---|---|---|---|---|
| 6,694,375 | B1 | 2/2004 | Beddus et al. | |
| 6,754,696 | B1 | 6/2004 | Kamath et al. | |
| 6,934,255 | B1* | 8/2005 | Toporek et al. | 370/235 |
| 7,024,479 | B2* | 4/2006 | Shah et al. | 709/227 |
| 7,032,009 | B2* | 4/2006 | Dowling | 709/217 |
| 7,293,099 | B1* | 11/2007 | Kalajan | 709/230 |
| 2001/0034782 | A1 | 10/2001 | Kinkade | |
| 2002/0055993 | A1 | 5/2002 | Shah et al. | |
| 2002/0072980 | A1 | 6/2002 | Dutta | |
| 2002/0073257 | A1* | 6/2002 | Beukema et al. | 710/105 |

OTHER PUBLICATIONS

Accelar 700 Server Switch Series White Paper, pp. 1-16, Feb. 1999.
Alacritech, Alacritech Server Network Adapters, http://www.alacritech.com/html/products.html.
Alteon WebSystems, Alteon Web Switching Products. http://www.alteonwebsystems.com/products/.
Alteon WebSystems, Next Generation Adapter Design and Optimization for Gigabit Ethernet.
Apostolopoulos et al., "Design, Implementation and Performance of a Content-Based Switch".
ArrowPoint Communications, ArrowPoint Content Smart Web Switches. http://www.arrowpoint.com/products/index.html.
Camarda et al. "Performance Evaluation of TCP/IP Protocol Implementation in End Systems", IEEE Proc. Comput. Digit. Tech. vol. 146, Jan. 1999.
Cisco LocalDirector Installation and configuration Guide, Nortel Networks, Feb. 1999, 13 pages.
Cisco Systems. Cisco Local Director. http://www.cisco.com/warp/public/cc/pd/si/1000/i.
Cohen et al., "On The Perfomance Of Tcp Splicing For Url-Aware Redirection", Proceedings of USITS' 99: The $2^{nd}$ USENIX Symposium on Internet Technologies & Systems, Boulder, Colorado, USA, Oct. 11-14, 1999, 10 pages.
D. Dunning G. Regnier, G. McAlpine et al., "The Virtual Interface Architecture", IEEE Micro, vol. 3, No. 2. pp. 66-76, 1998.
Direct Access File Systems (DAFS), http://www.dafscollaborative.org.
Edith Cohen et al., "Managing TCP Connections under Persistent HTTP", Proc. Of the Eighth International World Wide Web Conf., 1999.
Evan Speight, Hazim Abdel-Shafi, and John K. Bennett, "Realizing the Performance Potential of the Virtual Interface Architecture", In Proc. Of the $13^{th}$ ACM-SIGARCH International Conference on Supercomputing, Jun. 1999.
F5 Networks, BIG-IP Products. http://www.f5labs.com/f5products/bigip.
G. Welling, M. Ott, and S. Mathur, "CLARA: A Cluster-Based Active Router Architecture", Hot interconnects 8, pp. 53-60. 2000.
Giganet, Inc., Giganet cLAN Product Family. http://www.giganet.com/products/.
Hemal V. Shah et al., "CSP: A Novel System Architecture for Scalable Internet and Communication Services", Proceedings of the $3^{rd}$ USENIX Symposium on Internet Technologies and Systems, Mar. 26-28, 2001 p. 61-72.
Infiniband Arch. Spec. vol. 2. Rel. 1.0a.
Infiniband Arch. Spec. vol. 1, Rel. 1.0a.
Internet print out on BIG-IP® Controller, 1999, 15 pages.
Internet printout on End-to-End Services for Multivendor Storage Area Networks (SANs), http://www.-1.ibm.com/services/its/us/sanwp2.html, pp. 1-6 (printed on Oct. 17, 2000).
Interprophet Corporation. http://www.interprophet.com/.
IntevTXP1200 Network Processor. http://developer.intel.com/design/network/products/npfamily/ixp1200.htm.
Khattar et al., "Introduction to Storage Area Network, SAN", IBM International Technical Support Organization, Aug. 1999.
Maltz et al., "Improving HTTP Caching Proxy Performance with TCP Tap", Proceedings of the Fourth International Workshop on High Performance Protocol Architectures, pp. 98-103, Jun. 1998.
Maltz et al., "TCP Splicing for Application Layer Proxy Performance", Mar. 1998, 13 pages.
Netscaler, WebScaler Internet Accelerator. http://www.netscaler.com/products.html.
Oliver Spatscheck et al "Optimizing TCP Forwarder Performance", In IEEE/ACM Tran. Of Networking, vol. 8, No. 2. Apr. 2000.
Pai et al., "Locality-Aware Request Distribution in Cluster-based Network Servers", Proceedings of the Eighth International Conference on Architectural Support for Programming Languages and Operating Systems (ASPLOS-VIII), San Jose, CA, Oct. 1998, pp. 1-12.
Peterson, "Storage Area Networking", http://www.sresearch.com/wp_9801.htm, Jan. 1998, pp. 1-7.
Resonate White Paper. Central Dispatch 3.0. White Paper—Dec. 1999, pp. 1-9.
Resonate White Paper, Resonate Central Dispatch 3.3, Oct. 2000, pp. 1-12.
Shah et al., "Design and Implementation of Efficient Communication Abstractions Over Virtual Interface Architecture: Sockets and RPC Experience", Software-Practice and Experience, Softw. Pract. Exper., 00(S1), 1-20(1999).
Shah, Pu, and Madukkarumukumana, "High Performance Sockets and RPC over Virtual Interface (VI) Architecture", In Proc. Third Intl. Workshop on Communication, Architecture, and Applications for Network Based Parallel Computing, pp. 91-107, 1999.
Song et al., "Design Alternatives for Scalable Web Server Accelerators", Proc. of IEEE International Symposium on Performance Analysis Systems and Software, pp. 1-20, 2000.
Susai, "Web Transaction Management Opens Internet Bottlenecks", Technology Backgrounder, May 2000.
Virtual Interface Architecture Developer Guide, Intel Corporation, Revision 1.0, Sep. 9, 1998.
Virtual Interface Architecture Specification, Version 1.0. Dec. 10, 1997, pp. 1-83.
WebScaler Internet Traffic Surge Protection, Sep. 2000.
Windows Sockets Direct Path for System Area Networks, Microsoft Corporation, 2000.
Winsock Direct Specification, obtained in 2000 from website http://support.microsoft.com/support/kb/articles/Q260/1/76.ASP?LN=EN=US&SD_Gn&FR-0&gry-SAN%20direct%20path&rnk=1&src=DHCS_MSPSS_gn_SRCH&SPR=WIN2000, Publication Date Unknown, 6 pages.
Yang et al., "Efficient Support for Content-Based Routing in Web Server Clusters", Proceedings of USITS' 99:The $2^{nd}$ USENIX Symposium on Internet Technologies & Systems, Boulder, Colorado, U.S.A., Oct. 11-14, 1999.

* cited by examiner

DECOUPLING TCP/IP PROCESSING IN SYSTEM AREA NETWORKS WITH CALL FILTERING

CROSS REFERENCE TO RELATED APPLICATIONS

This application is a continuation application of and claims the benefit of priority to U.S. application Ser. No. 09/768,374, filed Jan. 22, 2001 now abandoned and U.S. application Ser. No. 09/768,375, filed Jan. 22, 2001 now U.S. Pat. No. 7,024, 479; the disclosures of the prior applications are considered part of (and are incorporated by reference in) the disclosure of this application.

BACKGROUND

The invention relates to decoupling Transmission Control Protocol/Internet Protocol (TCP/IP) processing in system area networks (SANs).

SANs provide computer network clients with access to computer applications and services stored on application nodes. Network clients typically utilize Transmission Control Protocol/Internet Protocol (TCP/IP) to communicate with application nodes. Application node operating systems have been responsible for processing TCP/IP packets. TCP/IP processing demand at application node resources can slow down the application processing speed.

DETAILED DESCRIPTION

Figure 1:
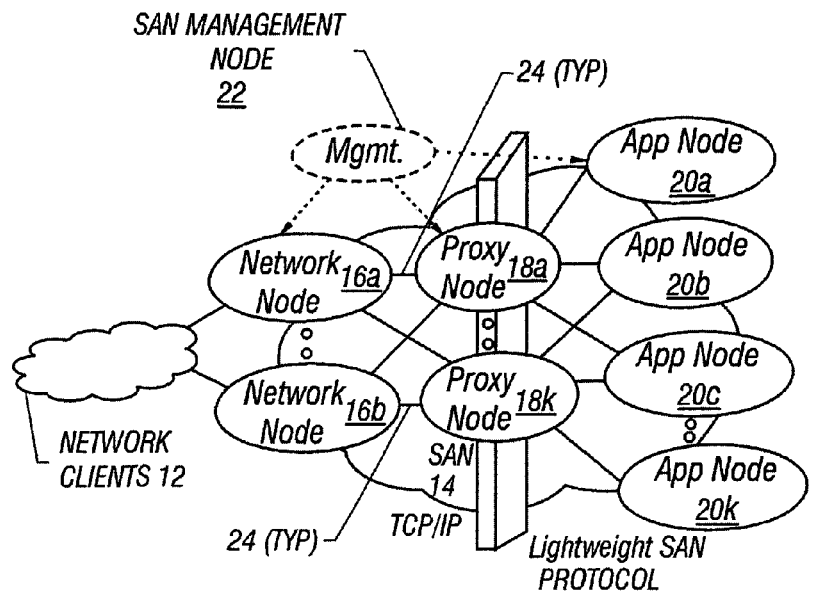
FIG. 1 illustrates a system area network.

FIG. 1 illustrates a computer system 10 including network clients 12, a system area network (SAN) 14 and a SAN management node 22. The network clients 12 can be configured, for example, to access services provided by application nodes 20a, 20b, . . . 20k through either a local area network (LAN) or a wide area network (WAN). The SAN 14 has one or more network nodes 16a . . . 16k, one or more proxy nodes 18a . . . 18k, and one or more application nodes 20a, 20b, 20c . . . 20k. Each node includes at least one processor, a memory unit, and at least one network connection port.

The network nodes 16a . . . 16k are platforms that provide an interface between the network clients 12 and the SAN 14. The network nodes 16a . . . 16k may be configured to perform load balancing across multiple proxy nodes 18a . . . 18k.

The proxy nodes 18a . . . 18k are platforms that can provide various network services including network firewall functions, caching functions, network security functions, and load balancing. The proxy nodes 18a . . . 18k also perform TCP/IP processing on behalf of the application nodes 20a, 20b, 20c . . . 20k. The proxy node 18a may, for example, include a computer configured to accomplish the tasks described below. The application nodes 20a, 20b, 20c . . . 20k are platforms that function as hosts to various applications, such as a web service, mail service, or directory service.

SAN channels 24 interconnect the various nodes. SAN channels 24 may be configured to connect a single network node 16a . . . 16k to multiple proxy nodes 18a . . . 18k, to connect a single proxy node 18a . . . 18k to multiple network nodes 16a . . . 16k and to multiple application nodes 20a, 20b, 20c . . . 20k, and to connect a single application node 20a, 20b, 20c . . . 20k to multiple proxy nodes 18a . . . 18k.

In FIG. 1, the network clients 12 utilize TCP/IP to communicate with the network nodes 16a . . . 16k and proxy nodes 18a . . . 18k. A TCP/IP packet enters the SAN 14 at a network node 16a and travels through a SAN channel 24 to a proxy node 18a. The proxy node 18a processes and translates the TCP/IP packet using a lightweight protocol.

The term "lightweight protocol" refers to a protocol that has low operating system resource overhead requirements. Examples of lightweight protocols include Winsock-DP Protocol and Credit Request/Response Protocol. If required, one or more lightweight protocol messages travel through another SAN channel 24 to an application node 20a.

Packets also can flow in the opposite direction, starting, for example, at the application node 20a as a lightweight protocol message. The lightweight protocol message travels through a SAN channel 24 to the proxy node 18a. The proxy node 18a processes the lightweight protocol message and if necessary, translates the message into one or more TCP/IP packets. The TCP/IP packets then travel from the proxy node 18a to a network node 16a through a SAN channel 24. The TCP/IP packets exit the SAN 14 through the network node 16a and are received by the network clients 12.

A single TCP/IP packet may be translated into one or more lightweight protocol messages, a single lightweight protocol message may be translated into one or more TCP/IP packets, multiple TCP/IP packets may be translated into a single lightweight protocol message, or multiple lightweight protocol messages may be translated into a single TCP/IP packet. A single TCP/IP packet may not generate any lightweight protocol messages, and a single lightweight protocol message may not generate any TCP/IP packets.

Figure 2:
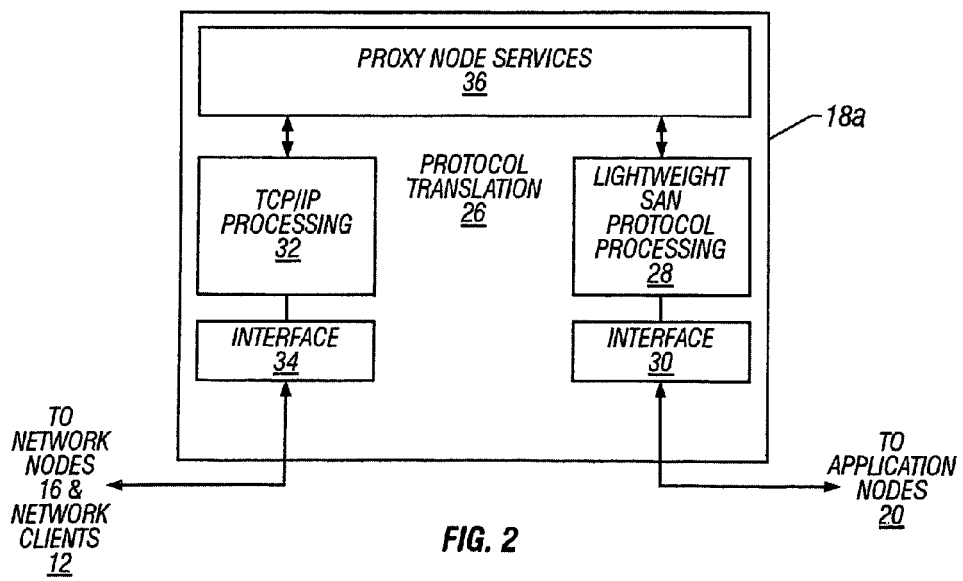
FIG. 2 illustrates a proxy node according to the invention.
Figure 3A:
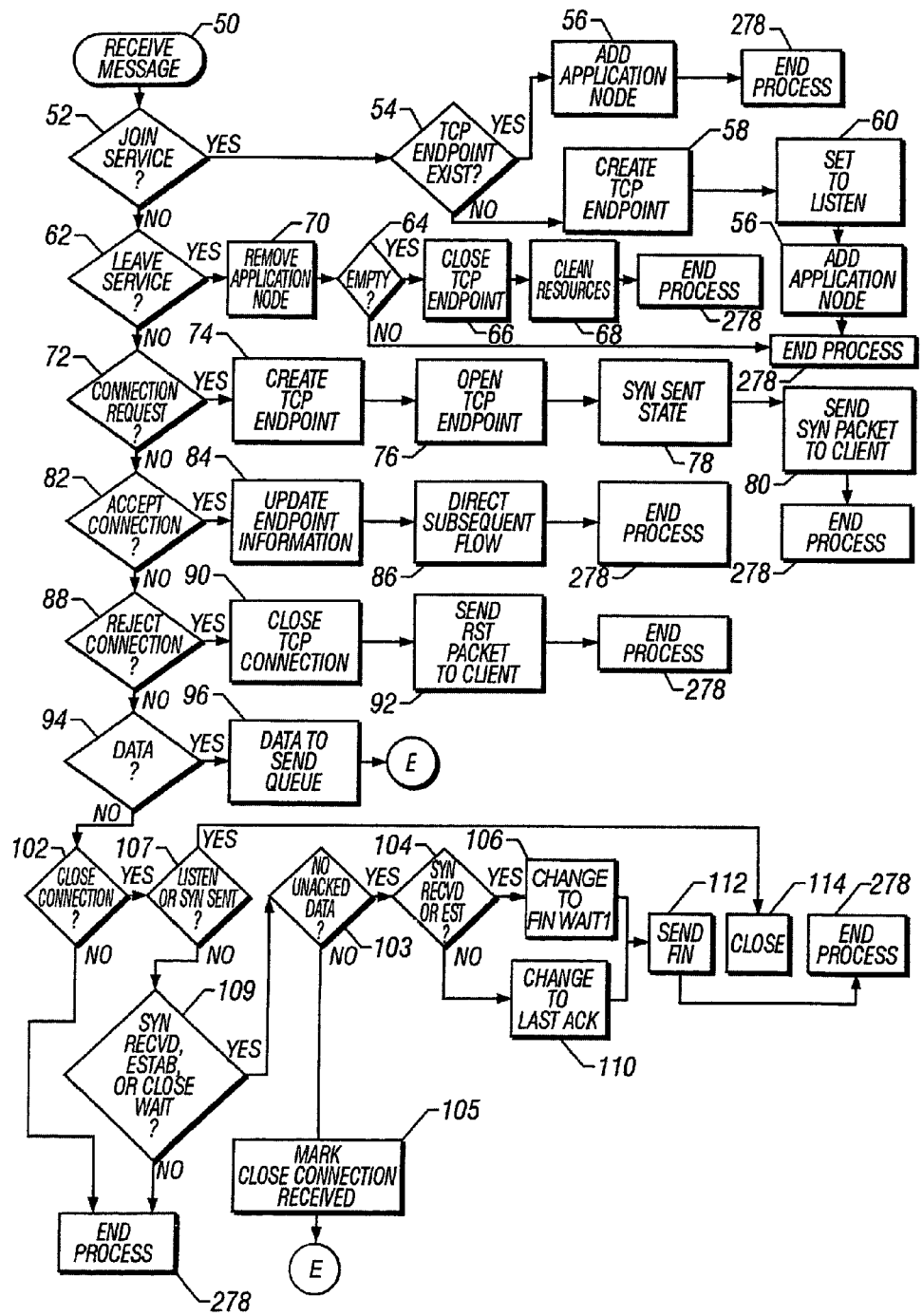
FIG. 3a-3g are flowcharts according to the invention.
Figure 3B:
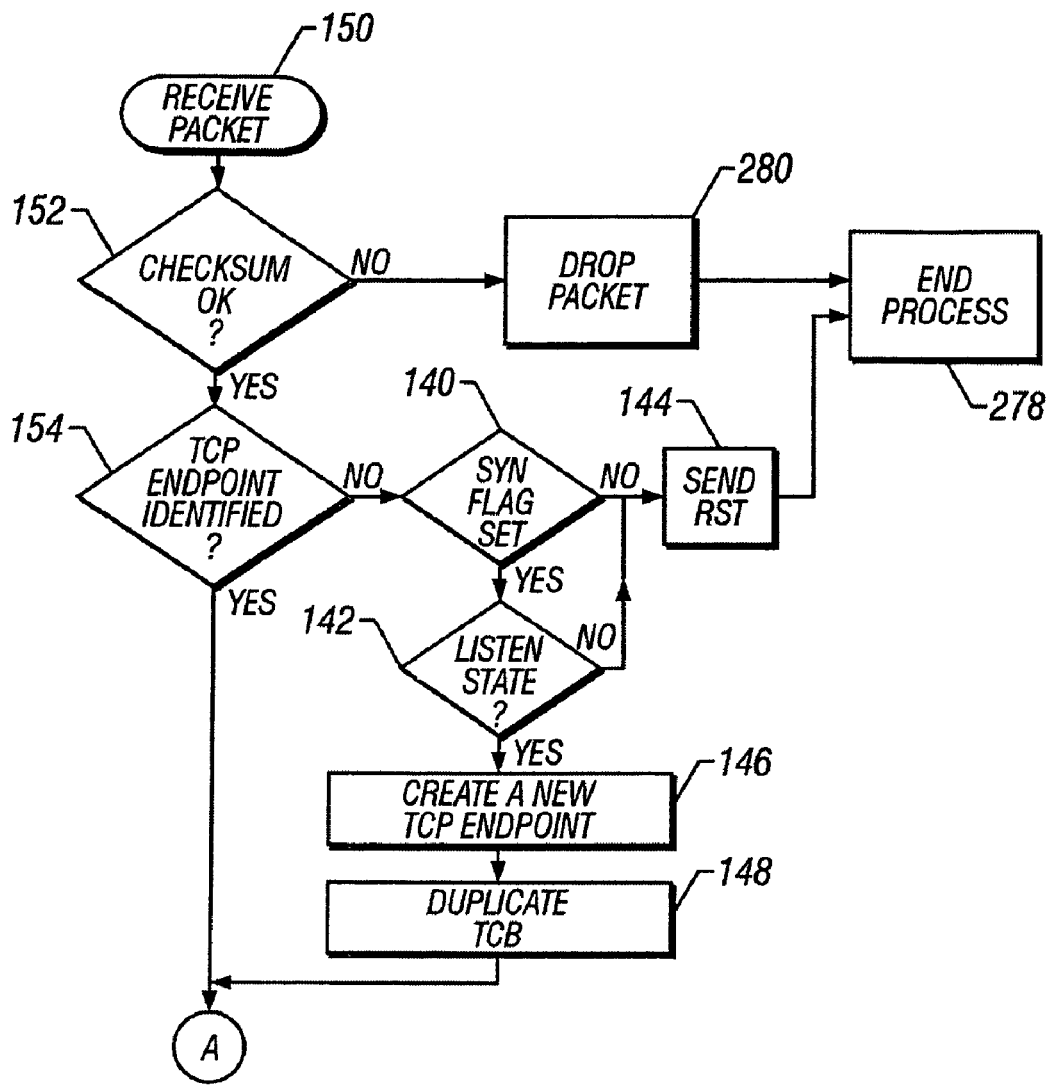
Figure 3C:
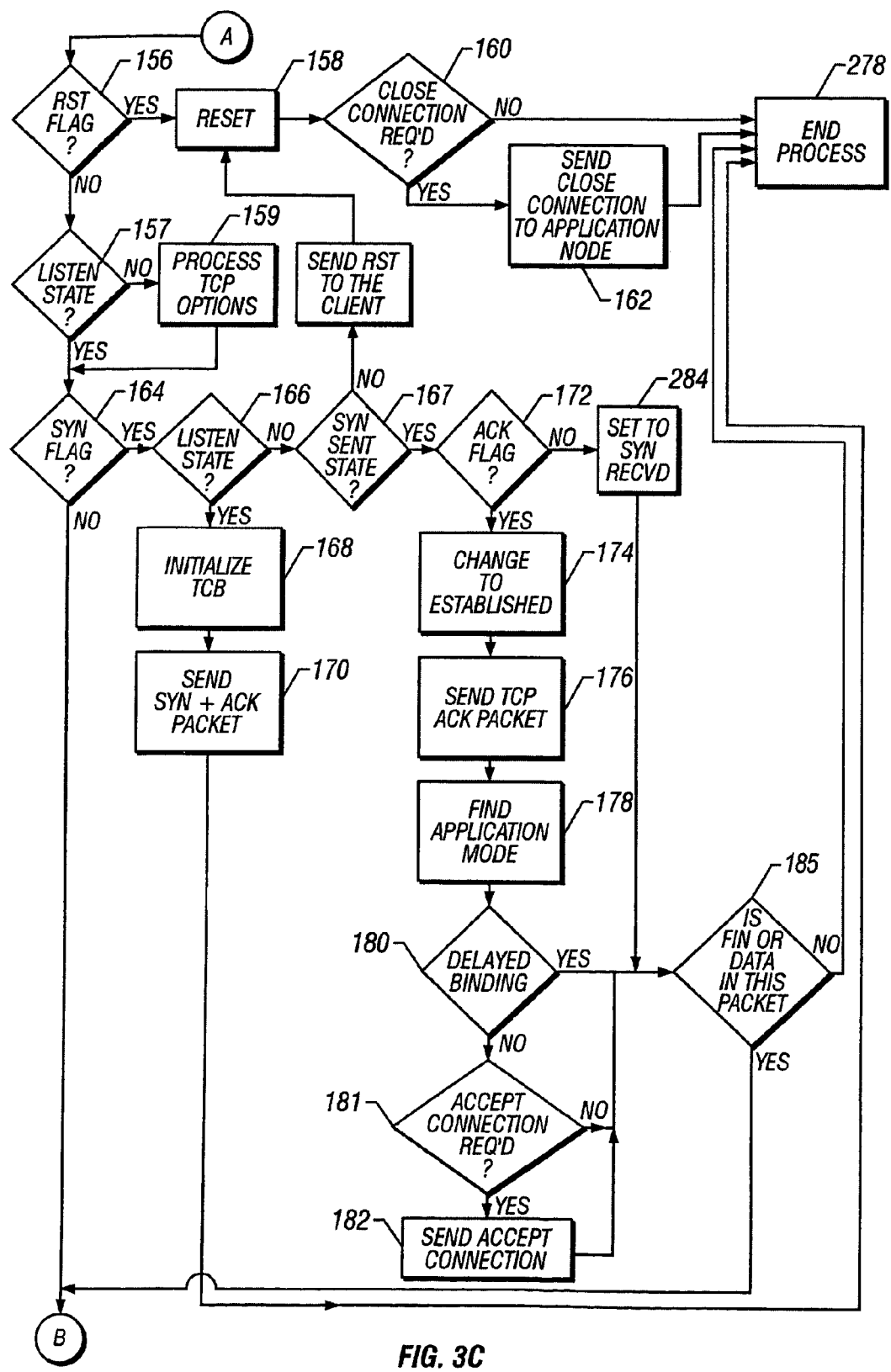
Figures 1, 3D:
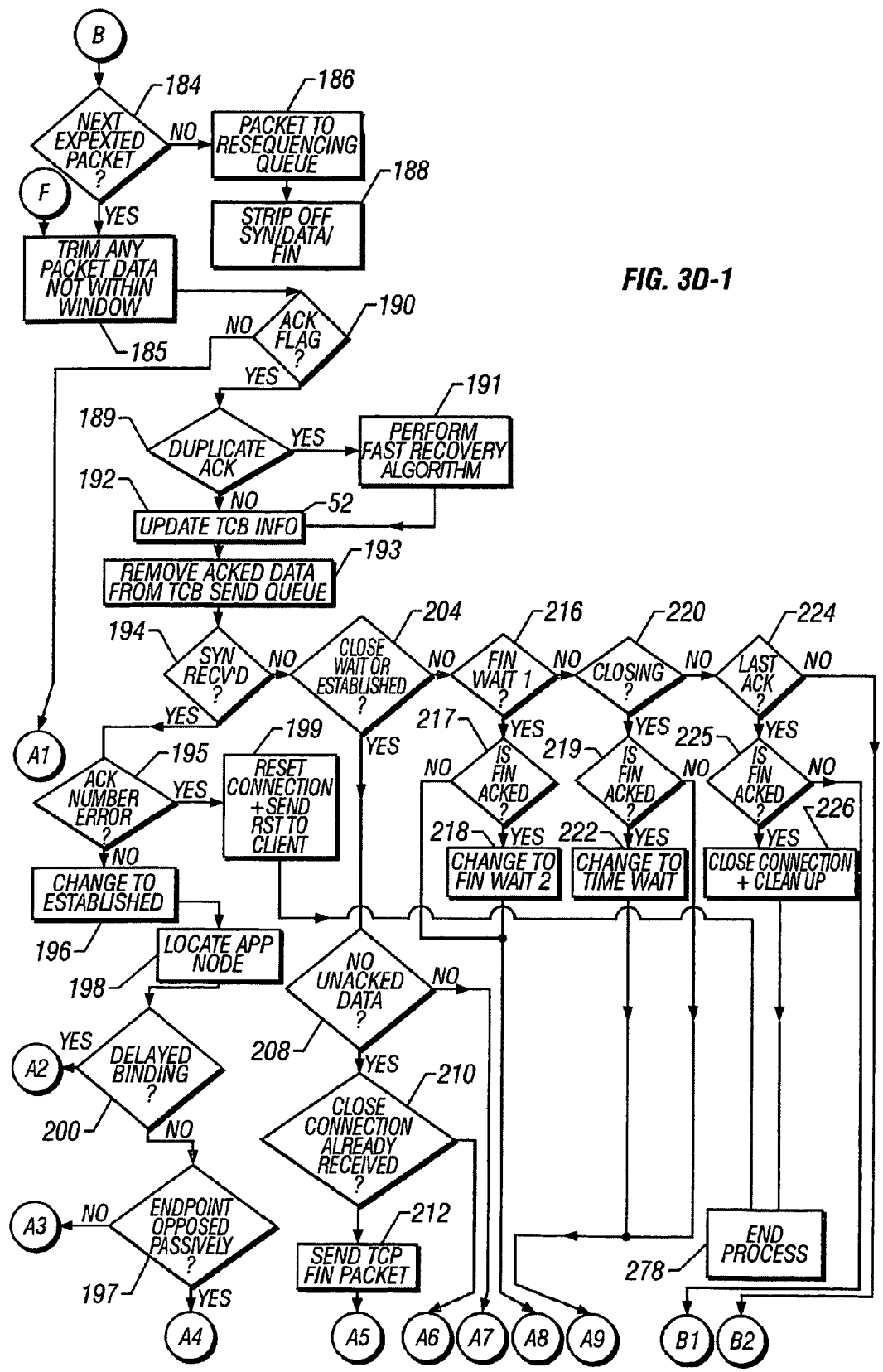
Figures 2, 3D:
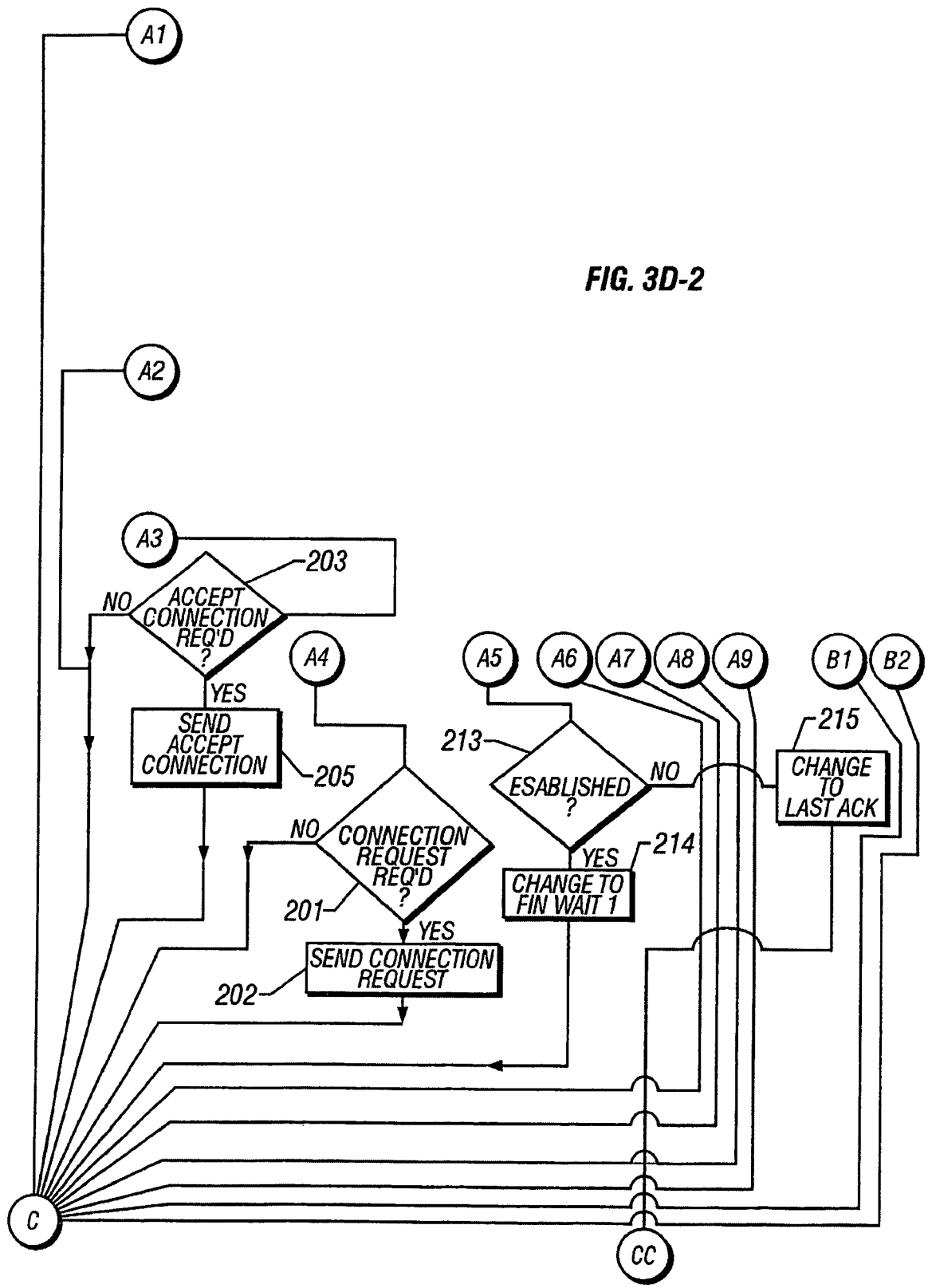
Figure 3E:
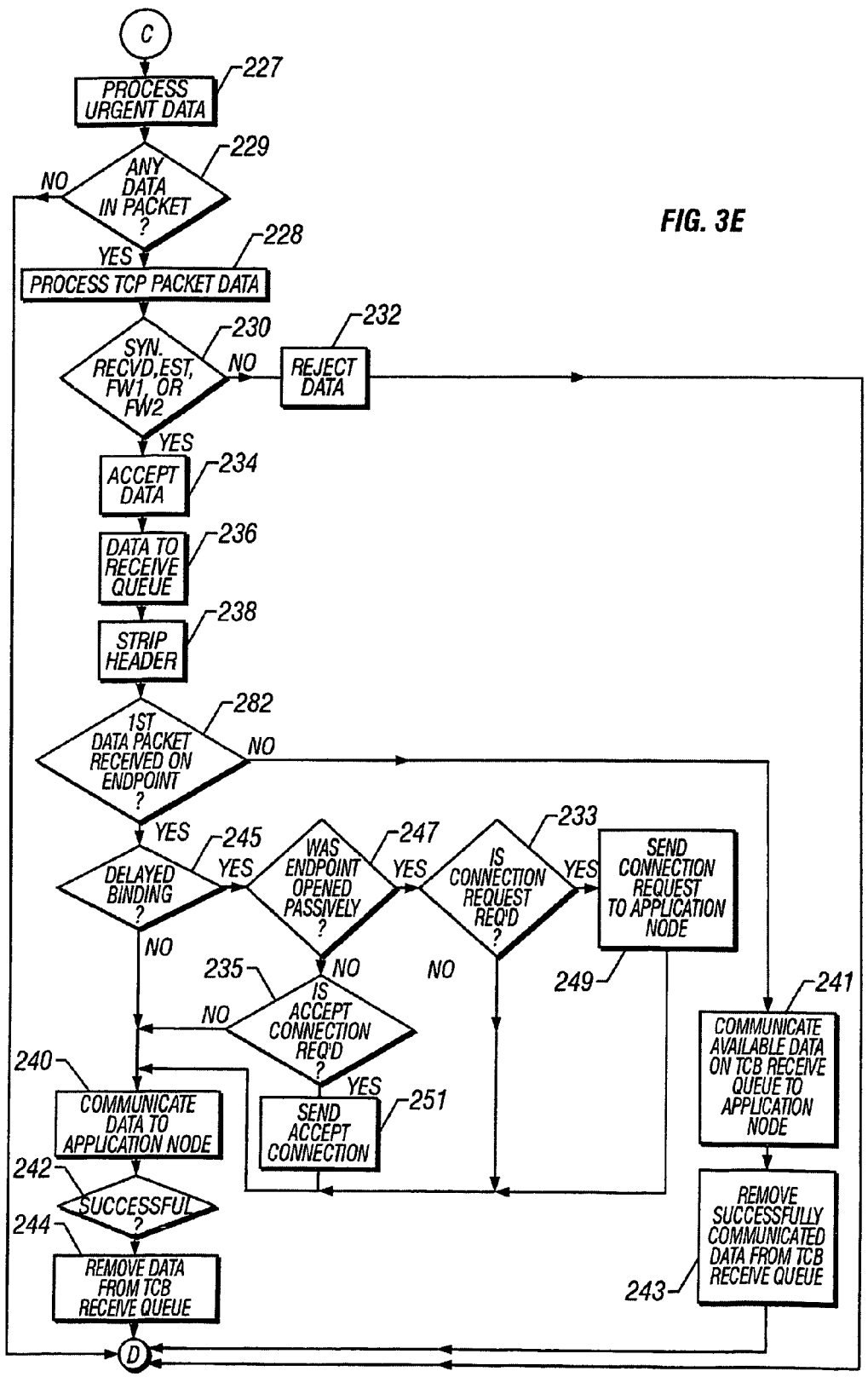
Figure 3F:
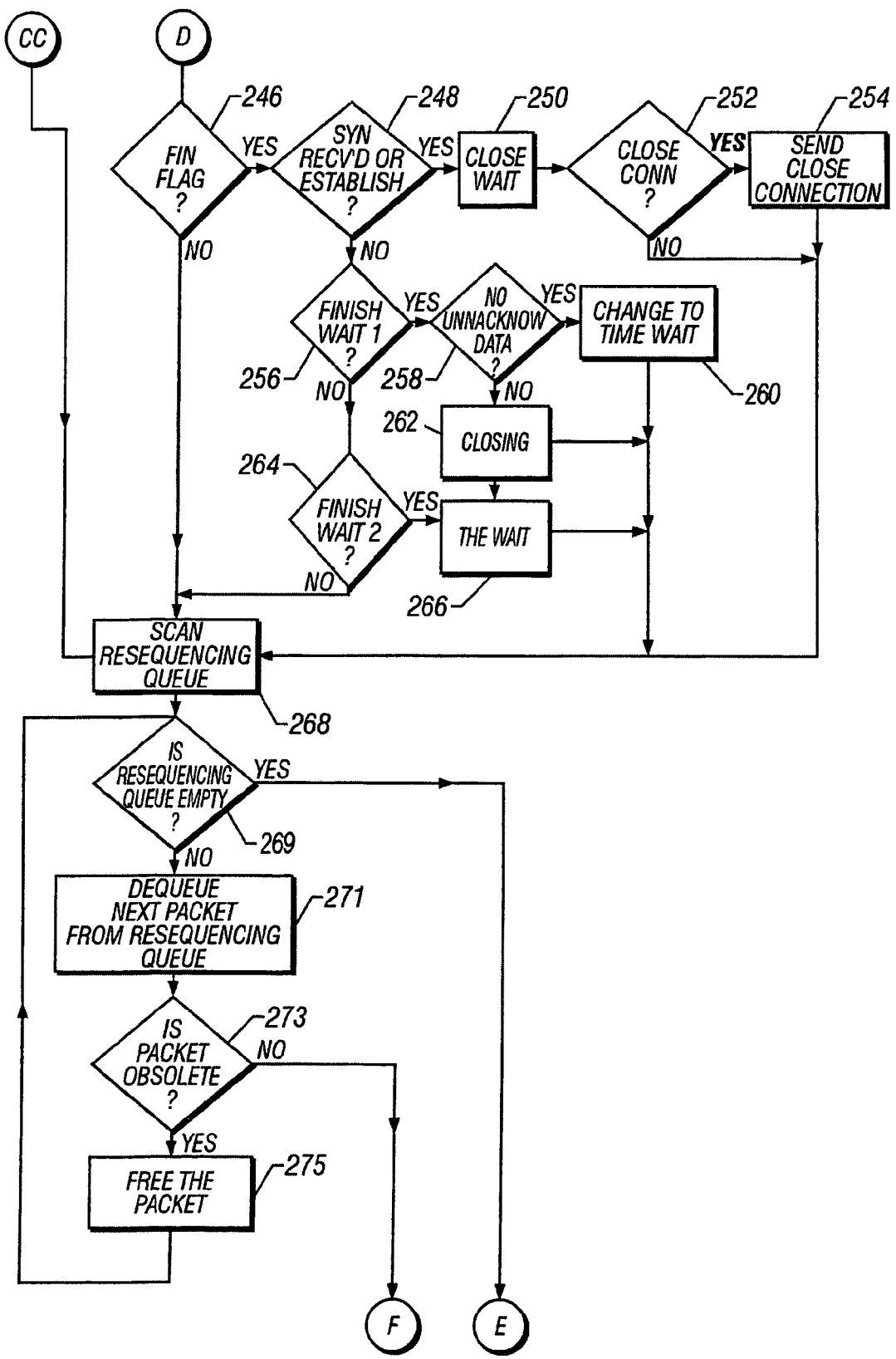
Figure 3G:
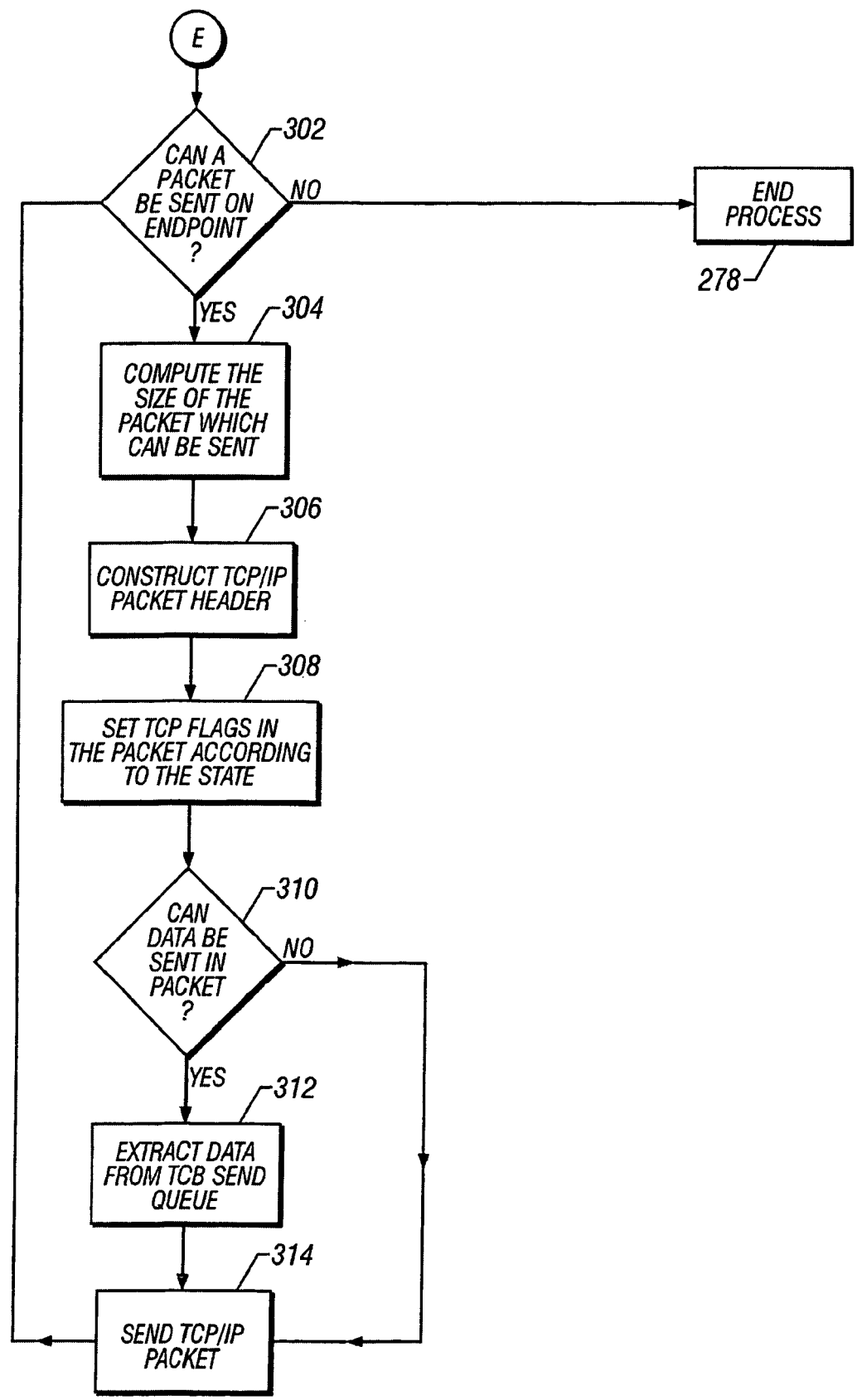
Figure 4:
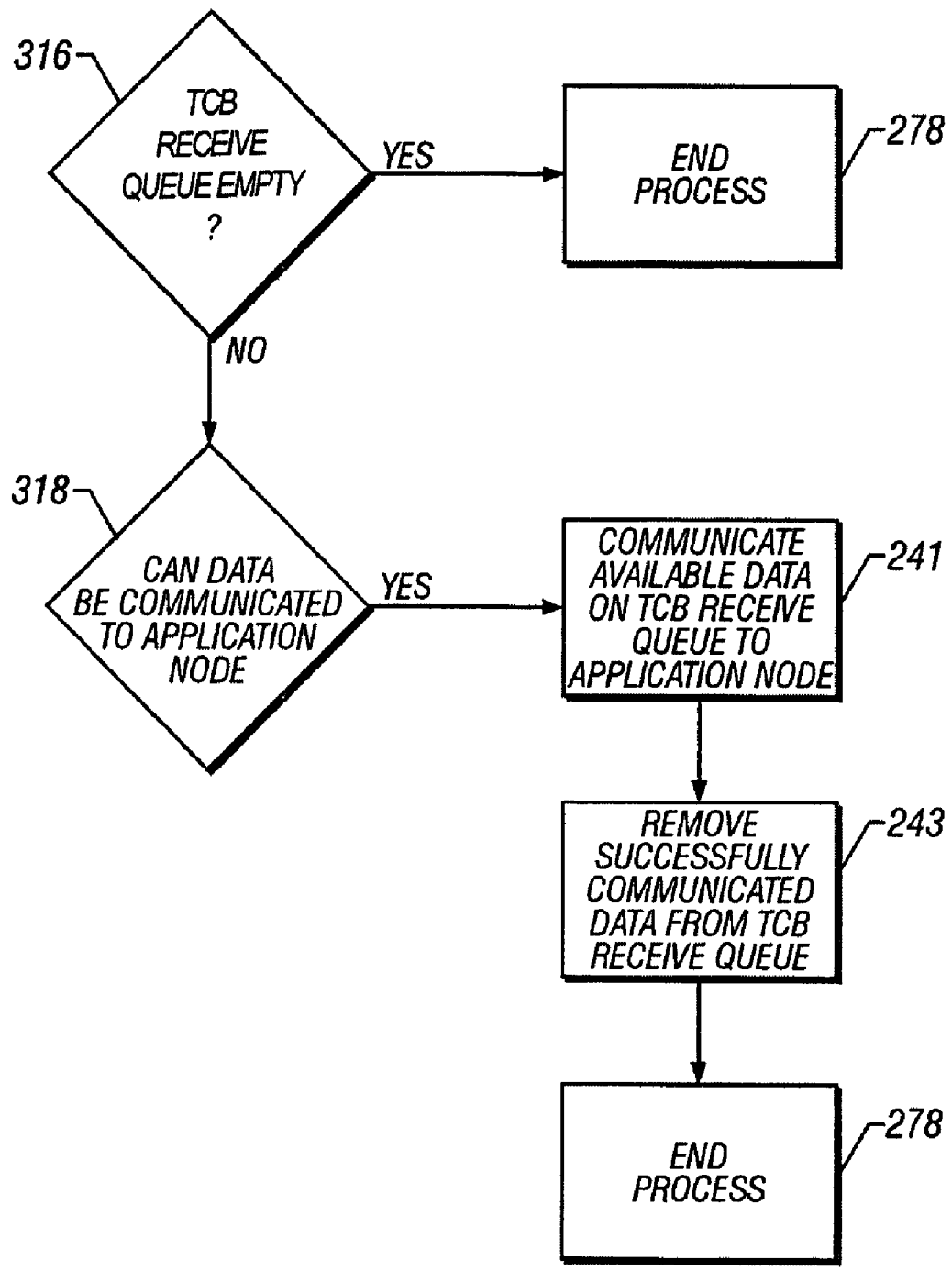
FIG. 4 is a flowchart according to the invention.

As shown in FIG. 2 each proxy node, such as the proxy node 18a, incorporates the functions of TCP/IP processing, protocol translating and lightweight protocol processing. The proxy node 18a includes two interfaces 34, 30 for connection to other SAN 14 components. A TCP/IP packet enters or exits the proxy node 18a at the interface 34. A TCP/IP processing module 32 accomplishes TCP/IP processing. A protocol translation engine 26 translates the TCP/IP packets and communicates the data using a lightweight protocol. A lightweight protocol processing module 28 accomplishes lightweight protocol processing. Lightweight protocol messages exit or enter the proxy node 18a at the interface 30.

Proxy nodes 18a . . . 18k also create or destroy SAN channels 24 between the network nodes 16a . . . 16k and the applications nodes 20a, 20b, 20c . . . 20k. Proxy nodes 18a . . . 18k also create or destroy TCP endpoints. Proxy nodes also relay TCP/IP byte streams arriving from network clients 12 through network nodes 16a . . . 16k, and addressed to application nodes 20a, 20b, 20c . . . 20k using a lightweight protocol. Proxy nodes 18a . . . 18k also communicate lightweight protocol data arriving from application nodes 20a, 20b, 20c . . . 20k to the network clients 12 through network nodes 16a . . . 16k using TCP/IP.

The proxy node 18a also may incorporate other standard proxy node services 36 including caching, firewall, and load balancing.

Proxy nodes 18a . . . 18k communicate with network nodes 16a . . . 16k and application nodes 20a . . . 20k using SAN channels 24. SAN channels 24 may be established at the time of service startup (i.e. the initial offering of an application's services on a proxy node 18a . . . 18k). SAN channels 24 may be destroyed, for example during a service shutdown, for SAN 14 resource management reasons, or due to a catastrophic error occurring in a SAN 14.

Referring to FIG. 3a-3g and FIG. 4, proxy nodes 18a. . . 18k perform protocol processing on behalf of application nodes 20a, 20b, 20c . . . 20k.

A proxy node 18a may receive 50, for example, a JOIN_SERVICE message 52 from an application node 20a, 20b, 20c . . . 20k. Proxy nodes 18a . . . 18k maintain lists of application nodes that may be accessed through the proxy node 18a . . . 18k. The JOIN_SERVICE message 52 indicates, that a particular application node 20a should be included on the list of application nodes offered by the proxy node 18a and be available for accessing by a network client 12. Upon receiving the JOIN_SERVICE message, the proxy node 18a determines 54 whether a corresponding TCP endpoint already exists on the proxy node 18a for that application service. If a corresponding TCP endpoint exists, the proxy node 18a adds 56 the application node 20a to the list of application nodes associated with that service and ends the process 278. If a corresponding TCP endpoint does not exist, the proxy node 18a creates 58 a corresponding TCP endpoint (with associated IP address and TCP port number) and sets 60 the TCP endpoint in a TCP LISTEN state. The proxy node 18a adds 56 the application node 20a to the list of application nodes associated with that service and then ends 278 the process.

Various TCP states are available. A CLOSED TCP state indicates that a TCP endpoint is closed. A LISTEN TCP state indicates that the TCP endpoint is listening. A SYN_SENT TCP state indicates that a SYN packet has been sent on the TCP endpoint. A SYN_RCVD state indicates that a SYN signal has been sent, a response has been received on a TCP endpoint, and receipt of an acknowledgement (ACK) signal is pending. An ESTABLISHED state indicates that a connection has been established and that data is being transferred. A CLOSE_WAIT state indicates that a finish (FIN) signal has been received and an application is closing. A FIN_WAIT_1 state indicates that the endpoint has closed, a FIN signal has been sent to an application, and receipt of an ACK and FIN is pending. A CLOSING state indicates that an application is closing and the TCP endpoint is awaiting receipt of an ACK. A LAST_ACK state indicates that a FIN TCP packet has been received, an application has closed, and the TCP endpoint is awaiting receipt of an ACK. A FIN_WAIT_2 state indicates that an application has closed and the TCP endpoint is awaiting receipt of a FIN signal. A TIME_WAIT-2MSL (maximum segment lifetime) state is a wait state for a TCP endpoint after actively closing.

A proxy node 18a . . . 18k, for example proxy node 18a, may receive a LEAVE_SERVICE message 62 from an application node 20a, 20b, 20c . . . 20k, for example application node 20a. A LEAVE_SERVICE message 62 indicates that a particular application node 20a should be removed from the list of application nodes 20a, 20b . . . 20k that may be accessed through a particular proxy node 18a. Upon receiving a LEAVE_SERVICE message 62, the proxy node 18a removes 70 the application node 20a from the list of accessible application nodes. The proxy node 18a then determines 64 whether the list of application nodes available through the proxy node 18a is empty. If the list is empty, the proxy node 18a closes 66 the corresponding TCP endpoint and cleans 68 any resources associated with the corresponding TCP endpoint. The proxy node 18a then ends 278 the process.

A proxy node 18a . . . 18k, for example proxy node 18a, may receive a CONNECTION_REQUEST message 72 from an application node 20a, 20b . . . 20k, for example application node 20a. A CONNECTION_REQUEST message indicates that an application node 20a wants to create a connection with a network client 12. The proxy node 18a creates 74 a corresponding TCP endpoint, the proxy node 18a then actively opens 76 the TCP endpoint, and sets 78 the TCP endpoint to a TCP SYN_SENT state. The proxy node 18a then sends 80 a TCP SYN packet to the corresponding network client 12, through a network node 16a . . . 16k.

A proxy node 18a . . . 18k, for example proxy node 18a, may receive an ACCEPT_CONNECTION message 82 from an application node 20a, 20b . . . 20k, for example application node 20a. An ACCEPT_CONNECTION message 82 is sent by an application node 20a to accept a connection request. The proxy node 18a updates 84 the TCP endpoint's connection information and directs 86 subsequent TCP flow to that application node 20a. The proxy node 18a then ends the process.

A proxy node 18a . . . 18k, for example proxy node 18a, may receive a REJECT_CONNECTION message 88 from an application node 20a, 20b . . . 20k, for example application node 20a. The proxy node 18a closes 90 the corresponding TCP connection and sends 92 a TCP RST packet to a network client 12 through a network node 16a . . . 16k. The proxy node 18a then ends 278 the process.

A proxy node 18a . . . 18k, for example proxy node 18a, may receive DATA 94 from an application node 20a . . . 20k, for example application node 20a. The proxy node 18a stores 96 the DATA on a send queue of the corresponding TCP endpoint. The proxy node then determines 302 whether a TCP/IP packet can be sent on the TCP endpoint. If not, the proxy node 18a ends 278 the process. If a TCP/IP packet can be sent, the proxy node 18a computes 304 the size of the packet that can be sent. The proxy node 18a constructs 306 the TCP/IP packet header and sets 308 the TCP flags in the TCP/IP packet according to the TCP state. The proxy node 18a then determines 310 if the data can be sent in the packet. If it can be sent, the proxy node 18a extracts 312 the data from the transmission control block (TCB) send queue and sends 313 the TCP/IP packet to a network client 12 through a network node 16a. A TCB is used by TCP/IP to store various information related to a particular TCP endpoint. TCBs typically contain information such as foreign and local IP addresses, foreign and local port numbers, options for endpoints, state information for each TCP endpoint, sequence numbers, window sizes, retransmission timers, etc.

A proxy node 18a . . . 18k, for example proxy node 18a, may receive a CLOSE_CONNECTION message 102 from an application node 20a, 20b . . . 20k, for example application node 20a. The proxy node determines 107 whether the TCP endpoint is in the LISTEN or SYN_SENT state. If the TCP endpoint is in either of these states, the proxy node 18a closes 114 the TCP endpoint and ends 278 the process. If the TCP endpoint is not in one of these states, the proxy node 18a determines 109 whether the TCP endpoint is in the SYN_RCVD, ESTABLISHED, or CLOSE_WAIT state. If it is, the proxy node then determines 103 whether there is unacknowledged data on the TCB send queue. If there is no unacknowledged data, the proxy node 18a determines 104 whether the TCP endpoint is in the SYN_RECVD or ESTABLISHED state. If it is, the proxy node 18a changes 106 the TCP state to FIN_WAIT_1. If the TCP endpoint is in the CLOSE_WAIT state, the proxy node 18a changes 110 the state of the TCP endpoint to LAST_ACK. The proxy node 18a then sends 112 a TCP FIN packet to the corresponding network client 12, through a network node 16a . . . 16k, and eventually closes the TCP/IP connection. If it is determined (in block 103) that there is unacknowledged data on the TCB send queue, the proxy node 18a marks 105 the CLOSE_CONNECTION_

RECEIVED flag for the TCP endpoint and proceeds to determine whether a TCP/IP packet can be sent on the TCP endpoint (block 302).

If a TCP endpoint needs to be shutdown on a particular proxy node 18a, the proxy node sends a SHUTDOWN_SERVICE message to the application node associated with that TCP endpoint. When the application node 20a receives a SHUTDOWN_SERVICE message from the proxy node 18a, the application node performs appropriate service cleanup, including shutting down the application in case any proxy service is unavailable.

Proxy nodes 18a . . . 18k process TCP/IP packets received from network clients 12 through network nodes 16a . . . 16k.

A proxy node 18a may receive 150 a TCP/IP packet from a network client 12 through a network node 16a. The proxy node 18a typically performs 152 a TCP checksum process. If the TCP checksum process result is unacceptable, the proxy node 18a drops 280 the packet and ends 278 the process.

If the result of the checksum process is acceptable, the proxy node attempts to identify 154 the TCP connection associated with the packet. If a TCP endpoint corresponding to TCP connection associated with the packet is identified, then the proxy node 18a continues with block 156. If no TCP connection is identified, the proxy node 18a determines 140 whether the SYN flag is set on the packet. If the SYN flag is not set, the proxy node 18a resets 144 the connection and ends 278 the process. If the SYN flag is set, the proxy node 18a determines 142 whether the corresponding TCP endpoint is in the LISTEN state. If it is not, the proxy node 18a resets 144 the connection and ends 278 the process. If the corresponding TCP endpoint is in the LISTEN state, the proxy node 18a creates 146 a new TCP endpoint. The proxy node then duplicates the TCB information and continues the process in block 156.

If a TCP connection is identified, the proxy node 18a determines 156 whether a reset (RST) flag on the TCP packet is set.

In one implementation the TCP header contains six flag bits, although in other cases there may be fewer or more flag bits in the TCP header. An URG flag bit indicates whether a TCP packet is urgent. An ACK flag bit indicates whether the TCP packet acknowledgement number is valid. A PSH flag bit indicates whether a proxy node 18a . . . 18k should pass the packet data to an application node 20a, 20b, 20c . . . 20k as soon as possible. A RST flag bit indicates whether the TCP endpoint should be reset. A SYN flag bit indicates whether sequence numbers should be synchronized to initiate a connection. A FIN flag bit indicates whether the sender is finished sending data.

If the RST flag is set, the proxy node 18a resets 158 the TCP/IP endpoint. The proxy node 18a then determines 160 whether a CLOSE_CONNECTION message should be sent to the application node 20a. If such a message is needed, the proxy node 18a sends 162 a CLOSE_CONNECTION message to the application node 20a. The proxy node 18a then ends 278 the process. If a CLOSE_CONNECTION message is not required, the proxy node 18a simply ends 278 the process. If a RST flag is not set in the TCP/IP packet, the proxy node 18a determines 157 whether the TCP endpoint is in a LISTEN state. If not, the proxy node 18a processes 159 the TCP options.

The proxy node 18a also determines 164 whether a SYN flag is set in the TCP packet. If the proxy node 18a determines 164 that the SYN flag is set, the proxy node 18a determines 166 whether the TCP endpoint is in a LISTEN state. If the TCP endpoint is in the LISTEN state, the proxy node 18a initializes 168 the associated TCB.

After initializing 168 the associated TCB, the proxy node 18a sends 170 a TCP SYN+ACK packet to the network client 12 and ends 278 the process. If, on the other hand, the TCP endpoint is not in the LISTEN state, the proxy node 18a determines 167 whether the TCP endpoint is in the SYN_SENT state. If the TCP endpoint is not in the SYN_SENT state, the proxy node 18a sends a RST to a network client 12 through the network node 16a. If the TCP endpoint is in the SYN_SENT state, the proxy node 18a determines 172 whether an ACK flag is set in the TCP packet. If the ACK flag is set, then the proxy node 18a changes 174 the TCP endpoint state to ESTABLISHED. The proxy node 18a then sends 176 a TCP ACK packet to the network client 12. The proxy node 18a identifies 178 the application node 20a corresponding to the TCP endpoint, and determines 180 whether delayed binding is required. If delayed binding is not required, the proxy node 18a determines 181 if an ACCEPT_CONNECTION message is required. If an ACCEPT_CONNECTION message is required, the proxy node 18a sends 182 an ACCEPT_CONNECTION message to the application node 20a. The proxy node 18a determines 185 if FIN or DATA is in the packet. If they are not, the proxy node 18a ends 278 the process. If either FIN or DATA is in the packet, the process continues with block 184. If the TCP endpoint is in the SYN_SENT state and the ACK flag is not set in the TCP packet, the proxy node sets 284 the TCP endpoint state to SYN_RCVD and determines 185 whether FIN or DATA is included in the packet.

The proxy node 18a determines 184 whether a received TCP packet received is the next TCP packet expected on a particular TCP endpoint. If it is not, then the proxy node 18a places 186 the TCP packet on a re-sequencing queue, and strips off 188 SYN/DATA/FIN. If the proxy node 18a determines that the packet received is the next packet expected, the proxy node 18a trims 185 any packet data not within the window, and determines 190 whether the TCP ACK flag is set in the packet. If the ACK flag is set, the proxy node 18a determines 189 if it is a duplicate ACK. If it is a duplicate ACK the proxy node 18a performs 191 a fast recovery algorithm. The proxy node then updates 192 the TCB information and removes 193 ACKED data from the TCB send queue. The proxy node 18a then determines 194 whether the TCP endpoint is in the SYN_RCVD state. If the TCP endpoint is in the SYN_RCVD state, the proxy node determines 195 whether there is an ACK number error. If there is not an ACK number error, the proxy node 18a changes 196 the TCP endpoint state to ESTABLISHED. If there is an ACK number error, the proxy node 18a resets 199 the connection and sends a RST to the network client 12 through the network nodes 16a . . . 16k. The proxy node 18a then ends 278 the process.

After changing the TCP/IP endpoint state to ESTABLISHED, the proxy node 18a identifies 198 the application node 20a that corresponds to the TCP endpoint and determines 200 whether delayed binding is required. If delayed binding is not required, the proxy node 18a determines 197 whether the corresponding TCP endpoint was opened passively. If the TCP endpoint was opened passively, the proxy node 18a determines 201 whether a CONNECTION_REQUEST message is required. If a CONNECTION_REQUEST message is required, the proxy node 18a sends a CONNECTION_REQUEST message to the application node 20a, if needed. The process continues with block 227. If the TCP endpoint was not opened passively, then the proxy node 18a determines 203 whether an ACCEPT_CONNECTION message is required. If an ACCEPT_CONNECTION message is required, then the proxy node 18a sends 205 an ACCEPT_CONNECTION message to the application node 20a. The process then continues with block 227.

The proxy node 18a determines 204 whether the TCP endpoint is in the CLOSE_WAIT or ESTABLISHED state. If the TCP endpoint is in CLOSE_WAIT or ESTABLISHED state, the proxy node 18a determines 208 whether there is any unacknowledged data on the TCB send queue. The proxy node 18a then determines 210 whether a CLOSE CONNECTION message already has been received from the application node 20a. The proxy node 18a sends 212 a FIN to the network client 12 through the network node 16a and determines 213 whether the TCP endpoint is in the ESTABLISHED state. If the TCP endpoint is in the ESTABLISHED state, the proxy node 18a changes 214 the TCP endpoint state to FIN WAIT 1. The process continues in with block 227. If the TCP endpoint is in the CLOSE_WAIT state, the proxy node 18a changes 215 the TCP endpoint state to LAST_ACK. The process continues with block 268 in which the proxy node 18a scans 268 the re-sequencing queue.

The proxy node 18a may determine 216 that the TCP endpoint is in the FIN_WAIT_1 state. If the TCP endpoint is in the FIN_WAIT_1 state, the proxy node 18a determines 217 whether the FIN is acknowledged (ACKED). If it is not, the process continues with block 227. If the FIN is ACKED, the proxy node 18a changes 218 the TCP endpoint state to FIN_WAIT_2. The process then continues with block 227.

The proxy node 18a determines 220 that the TCP endpoint is in the CLOSING state. If the TCP endpoint is in the CLOSING state, the proxy node 18a determines 219 whether the FIN is ACKED. If it is not, the process continues with block 227. If the FIN is ACKED, the proxy node 18a changes 222 the TCP endpoint state to TIME_WAIT. The process then continues with block 227.

The proxy node 18a may determine 224 that the TCP endpoint is in the LAST_ACK state. If the TCP endpoint is in the LAST ACK state, the proxy node 18a determines 225 whether the FIN is ACKED. If not, the process continues with block 227. If the FIN is ACKED, the proxy node closes 226 the connection and cleans up the TCP endpoint. The proxy node 18a then ends 287 the process.

As indicated by block 227, the proxy node 18a may process any TCP urgent data. The proxy node 18a then determines 229 if there is any data in the packet. If there is not, the proxy node proceeds to block 246. If there is data in the packet, the proxy node 18a processes 228 the TCP/IP packet data. The proxy node 18a determines 230 whether the corresponding TCP endpoint is in any of the TCP states SYN_RCVD, ESTABLISHED, FIN_WAIT_1 or FIN_WAIT_2. The data is only accepted 234 in these states. Otherwise, the data is rejected 232. If the data is accepted 234, the proxy node 18a places 236 the data on the receive queue of the TCP endpoint. The proxy node 18a then strips 238 off the TCP/IP header.

The proxy node 18a determines 282 if a data packet is the first data packet received on a particular TCP/IP endpoint. The proxy node 18a then determines 245 whether delayed binding is required. If it is not, the proxy node 18a communicates 240 the data to an application node 20a. The proxy node 18a then determines 242 if the data had been successfully communicated to the application node 20a. If the data had been successfully communicated, the proxy node 18a removes 244 the data from the receive queue of the TCP endpoint.

If the packet received is not the first packet received on the TCP/IP endpoint, the proxy node 18a communicates 241 the available data on the TCB receive queue to the application node. The proxy node 18a then removes 243 successfully communicated data from the TCB receive queue. The process continues with block 246.

If delayed binding is required, the proxy node determines 247 whether the TCP/IP endpoint was opened passively. If it was opened passively, the proxy node 18a determines 233 whether a CONNECTION_REQUEST is required. If a CONNECTION_REQUEST is required, the proxy node 18a sends 249 a CONNECTION REQUEST message to the application node 20a. If the endpoint was not opened passively, the proxy node 18a determines 235 whether an ACCEPT_CONNECTION is required. If an ACCEPT_CONNECTION is required, the proxy node 18a sends 251 an ACCEPT CONNECTION message to the application node 20a. The process continues with block 240 as described above.

The proxy node 18a may determine 246 that a FIN flag is set in a particular TCP packet. If a FIN flag is set, the proxy node 18a determines 248 if the TCP endpoint is in the SYN_RCVD or ESTABLISHED state. If the TCP endpoint is in either of these states, the proxy node 18a changes 250 the TCP endpoint state to CLOSE_WAIT. The proxy node determines 252 if a CLOSE_CONNECTION message should be sent to the application node 20a. If so, the proxy node 18a sends 254 the CLOSE_CONNECTION message to the application node 20a.

The proxy node may determine 256 that the TCP endpoint is in FIN_WAIT_1 state. If the TCP endpoint is in the FIN_WAIT_1 state, the proxy node 18a determines 258 whether any unacknowledged data exists on the corresponding TCB send queue. If the TCP endpoint is in FIN_WAIT_1 state and there is no unacknowledged data, the proxy node 18a changes 260 the TCP endpoint state to TIME_WAIT. Otherwise, the proxy node changes 262 the TCP endpoint state to CLOSING.

The proxy node 18a may determine 264 that a TCP endpoint is in FIN_WAIT_2 state. If the TCP endpoint is in FIN_WAIT_2 state, then the proxy node 18a changes 266 the TCP endpoint state to TIME_WAIT.

The proxy node 18a scans 268 the re-sequencing queue of the TCP endpoint and determines 269 whether the resequencing queue is empty. If it is not empty, the proxy node 18a de-queues 271 the next packet from the desequencing queue and determines 273 whether the packet is obsolete 273. If it is obsolete, the proxy node 18a frees 275 the packet and returns to block 275. If the proxy node 18a determines that the resequencing queue is empty, the process continues with block 302 as described above.

The proxy node 18a communicates data to the application node 20a using a lightweight protocol. The proxy node 18a determines 316 whether the TCB receive queue is empty. If the TCB receive queue is empty, the proxy node 18a ends 278 the process. If the TCB receive queue is not empty, then the proxy node 18a determines 318 whether data on the receive queue can be communicated to the application node 20a. If the data cannot be communicated, the proxy node 18a ends 278 the process. If the data can be communicated, the proxy node 18a communicates 241 the available data on the TCB receive queue to the application node 20a. The proxy node 18a then removes communicated data from the TCB receive queue. The proxy node 18a may perform processes described above periodically as a part of timer functions.

Figure 5:
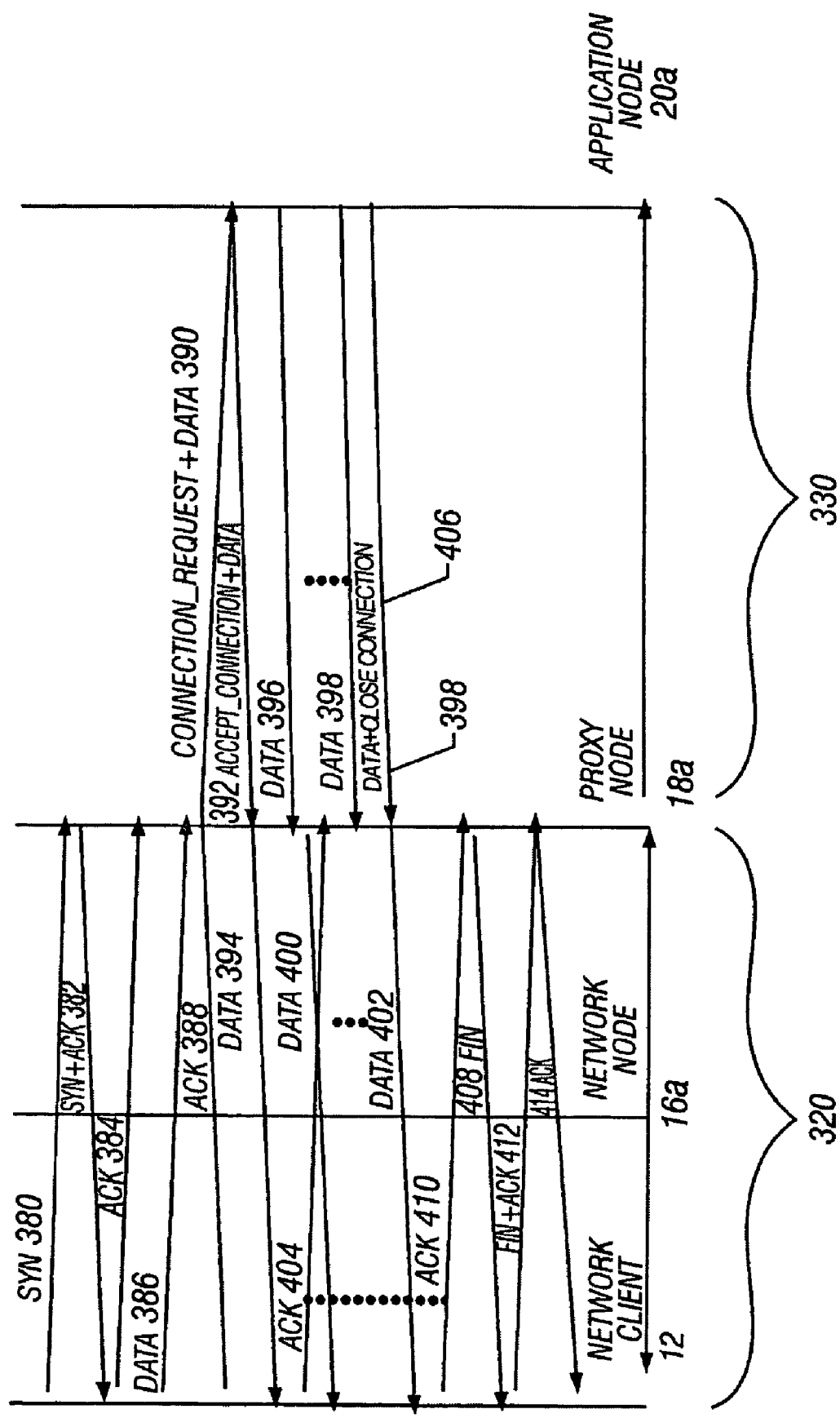
FIG. 5 is a timeline of communications.

FIG. 5 shows a set of exemplary communications between a network client 12, a network node 16a, a proxy node 18a and an application node 20a. Time is shown along the vertical axis. The end components included within the region identified by 320 communicate utilizing TCP/IP protocol. The end components included within the region identified by 330 communicate utilizing a lightweight protocol.

The timeline in FIG. 5 begins with a network client 12 issuing a SYN TCP/IP packet 380. The SYN packet 380 is a request from the network client 12 addressed to an application service on an application node 20a to establish a connection with a particular application service. This packet is passed through the network node 16a and is intercepted by the proxy node 18a. Since no information is required from the application node 20a, the proxy node 18a processes the TCP/IP SYN packet 380 and responds to the network client 12 with a SYN+ACK TCP/IP packet 382 that is sent through the network node 16a and that indicates that the SYN request 380 has been acknowledged. Each connection request is acknowledged before a connection can take place. The network client 12 receives the SYN+ACK signal 382 and responds with an ACK packet 384. The connection then is established between the network client 12 and the proxy node 18a.

The network client 12 begins transmitting data 386 to the proxy node 18a through the network node 16a over the established connection. At that point, the proxy node 18a realizes that involvement from the application node 20a is needed. Therefore, the proxy node 18a sends a CONNECTION REQUEST message 390 with or without the translated data to the application node 20a using a lightweight protocol. The application node 20a responds by issuing an ACCEPT CONNECTION lightweight protocol message 392 with any necessary data. The proxy node 18a processes and translates the message 392 . . . 398 and communicates the translated data 394 . . . 402 to the network client 12 through the network node 16a using TCP/IP.

When the network client 12 receives data it sends acknowledgement ACK packets 404 . . . 410 back to the proxy node 18a. When the application node 20a is finished sending all requested data, it sends a CLOSE CONNECTION message 406 to the proxy node 18a. Multiple lightweight protocol messages may be combined with each other. The proxy node 18a then sends a FIN TCP/IP packet 408 through the network node 16a to the network client 12 indicating that the connection should be terminated. The network client 12 acknowledges receipt of the signal 408 by sending a FIN+ACK TCP/IP packet 412 through the network node 16a to the proxy node 18a. The proxy node then sends an ACK packet 414 to the network client 12.

Figure 6:
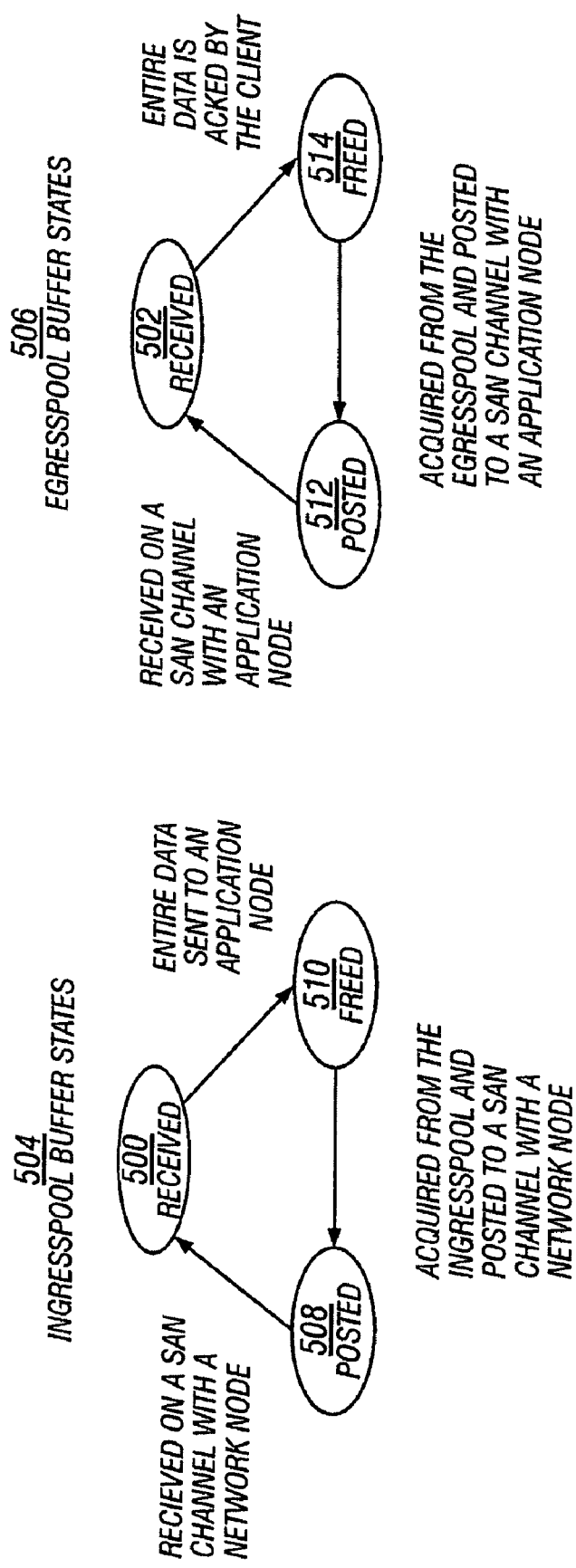
FIG. 6 is a state diagram.

FIG. 6 illustrates state transition diagrams for an IngressPool 504 buffer and an EgressPool 506 buffer. Proxy nodes, for example proxy node 18a, may be optimized for TCP/IP-to-lightweight protocol translation by using IngressPool 504 buffers and EgressPool 506 buffers to perform zero copy translation of data. The proxy node 18a may receive 500 data (from network clients 12 through network nodes 16a . . . 16k) and may receive 502 data (from application nodes 20a . . . 20k) simultaneously. The protocol translator 26 can be configured to perform zero-copy translation of data in a proxy node 18a. Other techniques also can be utilized to enable zero-copy translation of data. Proxy nodes 18a . . . 18k may maintain two pools of registered buffers. IngressPool 504 buffers may store incoming data and EgressPool 506 buffers may store outgoing data. Both of these pools may be registered with each interface 30, 34 in the proxy nodes 18a . . . 18k. The recommended size of the IngressPool 504 buffer may typically be determined by considering the maximum number of concurrent TCP connections to network clients 12 through network nodes 16a . . . 16k supported, the maximum size of receive windows advertised to the network client 12, and the maximum number of outstanding receive descriptors on the SAN channels 24. The recommended size of the EgressPool 506 buffer may typically be determined by considering the maximum number SAN channels 24 used for communication with application nodes 20a, 20b, 20c . . . 20k, the maximum amount of credits available per SAN channel 24, the maximum number of concurrent TCP connections supported, and the maximum size of receive windows advertised to the network clients. Each buffer may be described by a memory buffer that tracks the memory handle, offset within a buffer, and the length of data. Each buffer can exist in one of several main states: posted (508 & 512), received (500 & 502), and freed (510 & 514). By maintaining the memory buffer structure and states of the buffer, the proxy node 18a may achieve zero-copy translation.

Any higher layer service that executes policies above the transport layer can be built on top of the decoupling technique on a proxy node 18a. For example, a layer 5 (L5) web switch that maintains Hyper Text Transfer Protocol (HTTP) 1.0, HTTP-S (Secure) 1.0, HTTP 1.1, HTTP-S 1.1 connections with the network clients and HTTP 1.1 connections with the application nodes 20a, 20b, 20c . . . 20k can be built on top of a proxy node 18a. Additionally, HTTP 1.0, HTTP-S 1.0, HTTP 1.1, HTTP-S 1.1 data exchanged with network clients 12 may use TCP/IP; and HTTP 1.1 data exchanged between proxy nodes 18a . . . 18k and application nodes 20a, 20b . . . 20k can use lightweight protocol. Each HTTP transaction from a network client 12 can be mapped onto a HTTP 1.1 transaction to an application node 20a, 20b . . . 20k.

In addition to the foregoing techniques, the proxy node 18a can be configured to perform other processing related to TCP/IP including, for example, timers, algorithms such as congestion control, slow start, fast retransmit, and nagle.

Computer systems implementing these techniques may realize one or more of the following advantages. First, the techniques can result in faster SAN 14 operating speeds as a result of the elimination of system bottlenecking effects caused by extensive protocol processing overhead at the application nodes 20a, 20b, 20c . . . 20k. Second, decoupling TCP/IP processing from the application nodes 20a, 20b, 20c . . . 20k to the proxy nodes 18a . . . 18b can allow independent scaling of system TCP/IP processing capabilities and application processing capabilities. Third, since these techniques are typically not constrained by legacy API (sockets), operating system environment, or hardware platform, systems may be optimized to meet both TCP/IP and lightweight protocol processing demands. Fourth, other value-added services, such as, load balancing, caching, firewall, content transformation, and security protocol processing can be built on top of these decoupling techniques. SANs 14 incorporating the techniques described above can incorporate two levels of load balancing. At one level, the network nodes 16a . . . 16k can perform session level load balancing on a group of proxy nodes 18a . . . 18k using network address translation techniques or Internet protocol tunneling techniques. At a second level, each proxy node 18a . . . 18k can perform application level load balancing on a group of application nodes 20a, 20b, 20c . . . 20k.

Furthermore, systems using the techniques described above can provide increased flexibility. In addition, failures incurred in TCP/IP processing may be treated independently from application failures, thus providing improved SAN 14 reliability. Additionally, resource contention between application processing demands and TCP/IP processing demands can be significantly reduced.

Various features of the system may be implemented with hardware, software or with a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   receiving one or more packets, at a proxy node in a system area network, from a first node that generated the one or more packets by translating the one or more packets from a first transport-layer connection-oriented protocol to a second transport-layer connection-oriented protocol in response to an examined file descriptor being of a first type;
   translating the one or more packets to the first transport-layer connection-oriented protocol, which is used by a second node, to create one or more translated packets, the translating comprising managing first and second endpoints corresponding to the first and second protocols;
   processing, on behalf of the first node, the one or more translated packets according to the first transport-layer connection-oriented protocol; and
   sending the one or more translated packets from the proxy node to the second node;
   wherein the first type comprises transport, being of a partition of a file descriptor range, and the examined file descriptor is associated with a call corresponding to an application program interface for the first transport-layer connection-oriented protocol.

2. The method of claim 1, wherein translating the one or more packets comprises translating a single packet into multiple translated packets.

3. The method of claim 1, wherein receiving the one or more packets comprises receiving multiple packets, translating the one or more packet comprises translating the multiple packets into a single translated packet, and sending the one or more translated packet comprises sending the single translated packet.

4. The method of claim 1, wherein the first protocol is based on Transmission Control Protocol/Internet Protocol (TCP/IP) and the second protocol is based on a lightweight system area network protocol.

5. The method of claim 1, wherein the proxy node relays byte streams from the second node to the first node.

6. The method of claim 1, wherein the first node comprises an application node, and the second node comprises a network client coupled to the proxy node through a network node.

7. The method of claim 1, further comprising performing load balancing among multiple application nodes based on application processing requirements.

8. An article comprising a non-transitory computer-readable medium that stores computer executable instructions for causing a computer system to perform operations comprising:
   receiving one or more packets, at a proxy node in a system area network, from a first node that generated the one or more packets by translating the one or more packets from a first transport-layer connection-oriented protocol to a second transport-layer connection-oriented protocol in response to an examined file descriptor being of a first type;
   translating the one or more packets to the first transport-layer connection-oriented protocol, which is used by a second node, to create one or more translated packets, the translating comprising managing first and second endpoints corresponding to the first and second protocols;
   processing, on behalf of the first node, the one or more translated packets according to the first transport-layer connection-oriented protocol; and
   sending the one or more translated packets from the proxy node to the second node;
   wherein the first type comprises transport, being of a partition of a file descriptor range, and the examined file descriptor is associated with a call corresponding to an application program interface for the first transport-layer connection-oriented protocol.

9. The article of claim 8, wherein translating the one or more packets comprises translating a single packet into multiple translated packets.

10. The article of claim 8, wherein receiving the one or more packets comprises receiving multiple packets, translating the one or more packet comprises translating the multiple packets into a single translated packet, and sending the one or more translated packet comprises sending the single translated packet.

11. The article of claim 8, wherein the first protocol is based on Transmission Control Protocol/Internet Protocol (TCP/IP) and the second protocol is based on a lightweight system area network protocol.

12. The article of claim 8, wherein the proxy node relays byte streams from the second node to the first node.

13. The article of claim 8, the operations further comprising performing load balancing among multiple application nodes based on application processing requirements.

14. An apparatus comprising:
   a plurality of network ports; and
   a processor configured to perform operations comprising:
   receiving through one of the network ports one or more packets, at a proxy node in a system area network, from a first node that generated the one or more packets by translating the one or more packets from a first transport-layer connection-oriented protocol to a second transport-layer connection-oriented protocol in response to an examined file descriptor being of a first type;
   translating the one or more packets to the first transport-layer connection-oriented protocol, which is used by a second node, to create one or more translated packets, the translating comprising managing first and second endpoints corresponding to the first and second protocols;
   processing, on behalf of the first node, the one or more translated packets according to the first transport-layer connection-oriented protocol; and
   sending through one of the network ports the one or more translated packets from the proxy node to the second node;
   wherein the first type comprises transport, being of a partition of a file descriptor range, and the examined file descriptor is associated with a call corresponding to an application program interface for the first transport-layer connection-oriented protocol.

15. The apparatus of claim 14, wherein translating the one or more packets comprises translating a single packet into multiple translated packets.

16. The apparatus of claim 14, wherein receiving the one or more packets comprises receiving multiple packets, translating the one or more packet comprises translating the multiple packets into a single translated packet, and sending the one or more translated packet comprises sending the single translated packet.

17. The apparatus of claim 14, wherein the first protocol is based on Transmission Control Protocol/Internet Protocol (TCP/IP) and the second protocol is based on a lightweight system area network protocol.

18. The apparatus of claim 14, wherein the proxy node relays byte streams from the second node to the first node.

19. The apparatus of claim 14, the operations further comprising performing load balancing among multiple application nodes connected to the network ports based on application processing requirements.

20. A system comprising:
a system area network (SAN) comprising a network node, a proxy node, and an application node; and
a network client;
wherein the proxy node comprises a processor configured to perform operations comprising:
receiving one or more packets from the application node, which generated the one or more packets by translating the one or more packets from Transmission Control Protocol/Internet Protocol (TCP/IP) to a lightweight SAN protocol in response to an examined file descriptor being of a first type;
translating the one or more packets to the TCP/IP protocol, which is used by the network node, to create one or more translated packets, the translating comprising managing first and second endpoints corresponding to the TCP/IP and lightweight SAN protocols;
processing, on behalf of the application node, the one or more translated packets according to the TCP/IP protocol; and
sending the one or more translated packets from the proxy node to the network node;
wherein the first type comprises transport, being of a partition of a file descriptor range, and the examined file descriptor is associated with a call corresponding to an application program interface for the first transport-layer connection-oriented protocol.

21. The system of claim 20, wherein translating the one or more packets comprises translating a single packet into multiple translated packets.

22. The system of claim 20, wherein receiving the one or more packets comprises receiving multiple packets, translating the one or more packet comprises translating the multiple packets into a single translated packet, and sending the one or more translated packet comprises sending the single translated packet.

23. The system of claim 20, wherein the proxy node relays TCP/IP byte streams from the network node to the application node.

24. The system of claim 20, wherein the system area network comprises a plurality of proxy nodes, and the network node comprises a processor configured to perform load balancing among the plurality of proxy nodes based on protocol processing requirements.

25. The system of claim 24, wherein the system area network comprises a plurality of application nodes, and the proxy node processor is further configured to perform load balancing among the plurality of application nodes based on application processing requirements.

\* \* \* \* \*